E. S. WOOLLEY.
MOTOR VEHICLE LIGHT.
APPLICATION FILED NOV. 9, 1920.
1,410,864. Patented Mar. 28, 1922.
3 SHEETS—SHEET 1.
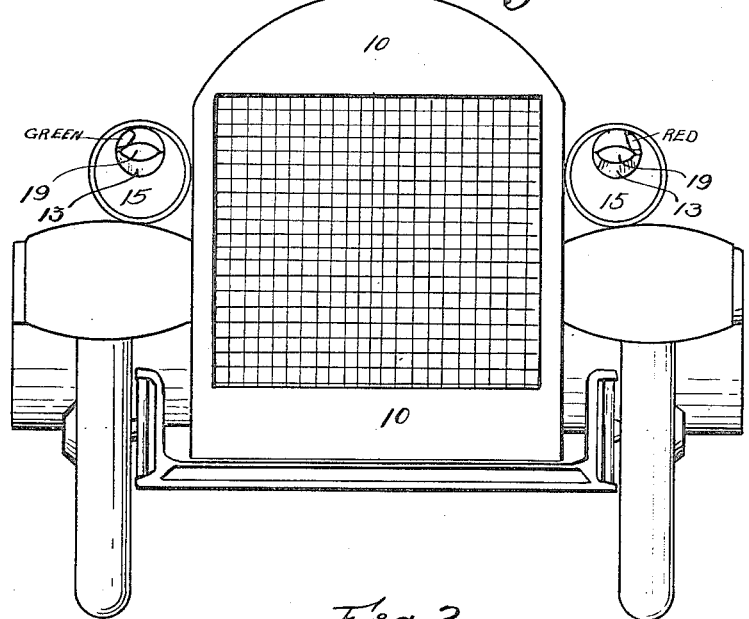
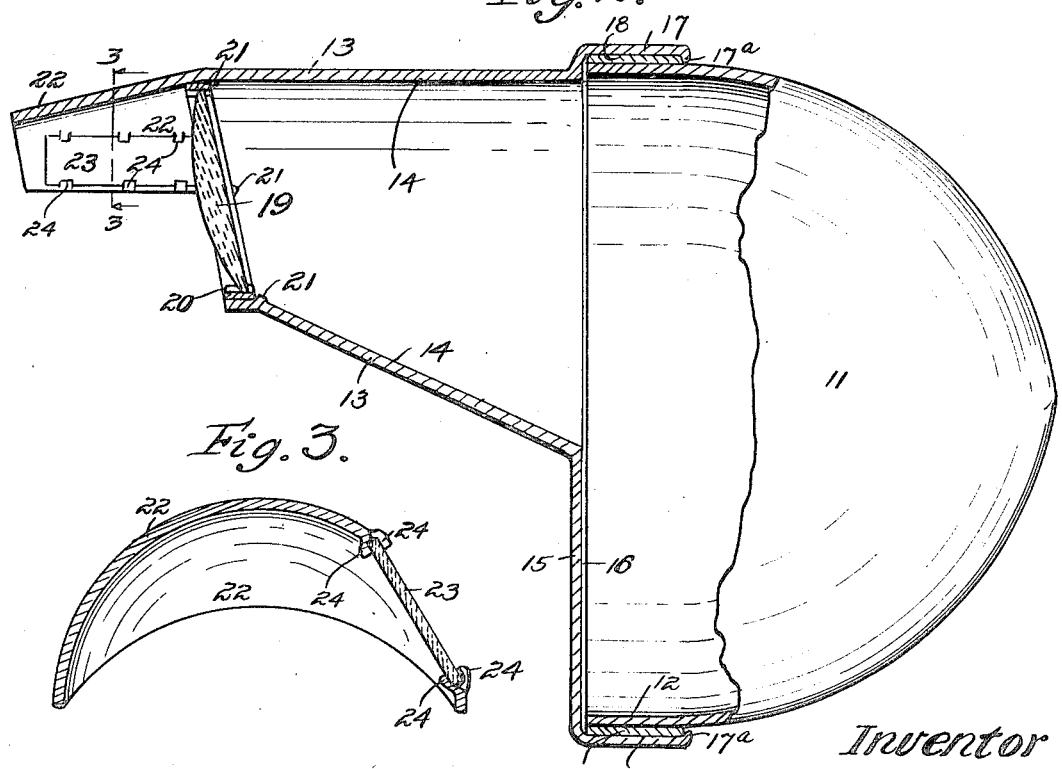
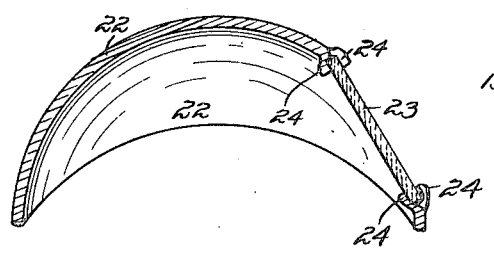
Witness
D. L. Cope
Inventor
Ernest S. Woolley
By Bair & Freeman
Attorneys

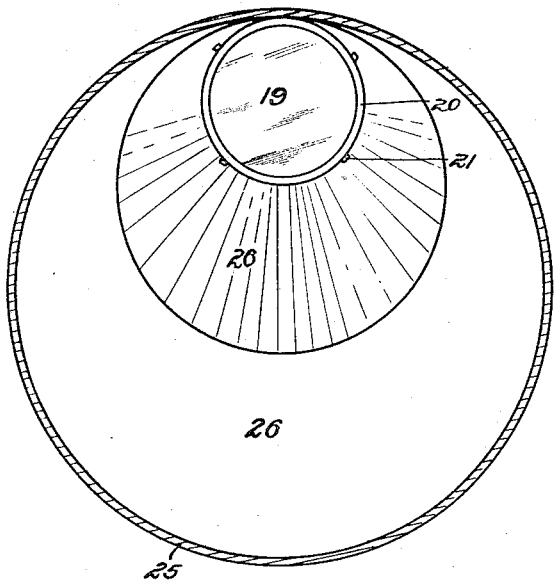
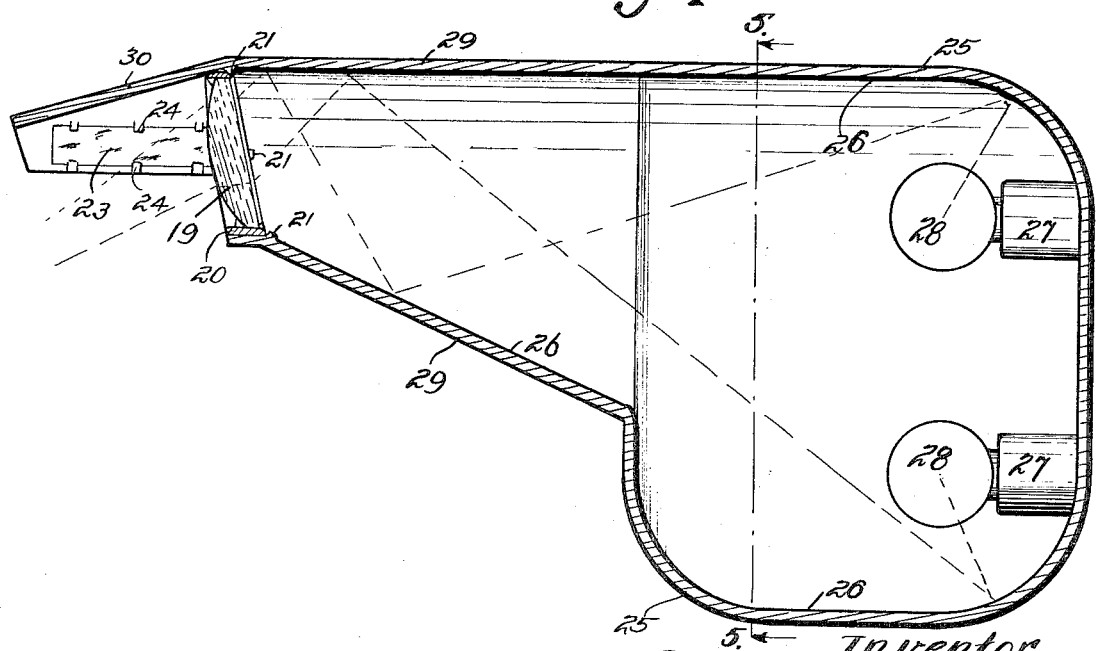

E. S. WOOLLEY.
MOTOR VEHICLE LIGHT.
APPLICATION FILED NOV. 9, 1920.
1,410,864.
Patented Mar. 28, 1922.
3 SHEETS—SHEET 3.
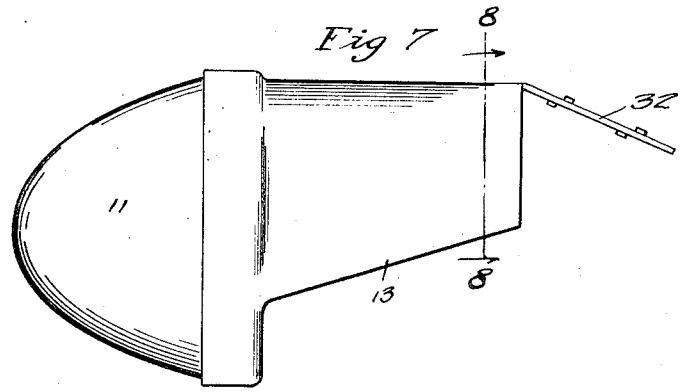
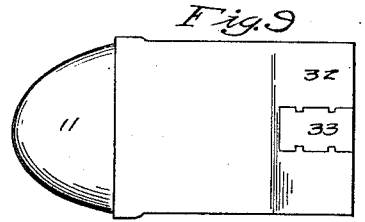
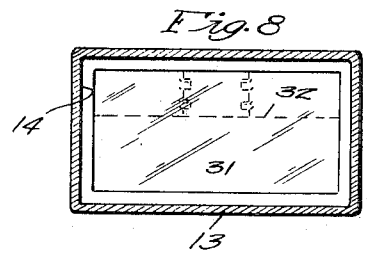
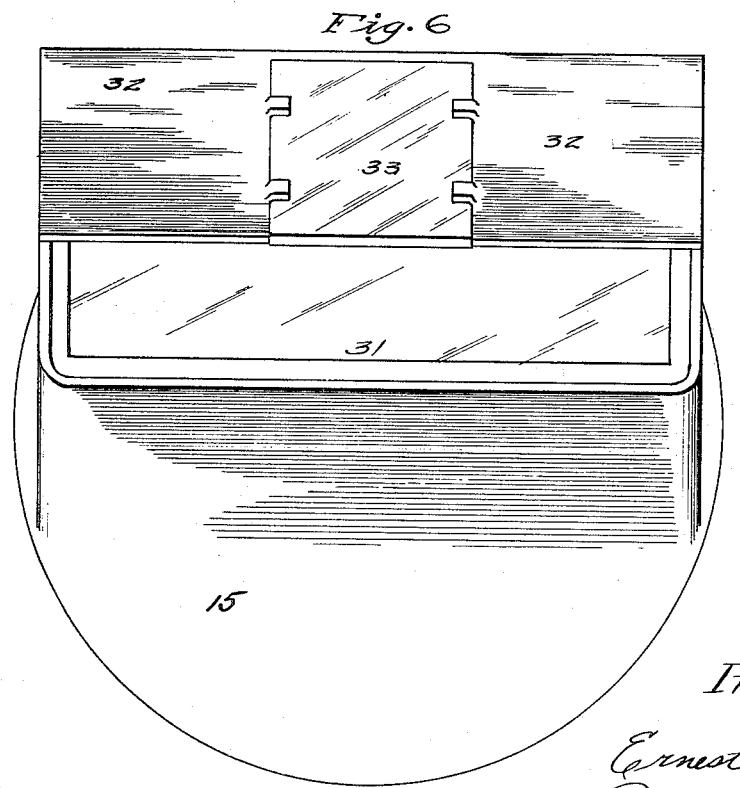
Witness
Lynn Letta
Inventor
Ernest S. Woolley
By Bair & Freeman
Attorneys

UNITED STATES PATENT OFFICE.

ERNEST S. WOOLLEY, OF DES MOINES, IOWA, ASSIGNOR TO FRED SMITH, OF TORONTO, ONTARIO, CANADA.

MOTOR-VEHICLE LIGHT.

1,410,864.　　　Specification of Letters Patent.　Patented Mar. 28, 1922.

Application filed November 9, 1920. Serial No. 422,755.

*To all whom it may concern:*

Be it known that I, ERNEST S. WOOLLEY, a subject of the King of Great Britain, and a resident of Des Moines, in the county of Polk and State of Iowa, United States of America, have invented a certain new and useful Motor-Vehicle Light, of which the following is a specification.

The object of my invention is to provide a motor vehicle light, which will throw a beam of light forwardly and upon the ground without glaring the vision of the driver of an automobile coming towards the lights, the lights being of simple, durable and inexpensive construction.

More particularly, my invention relates to an improvement in vehicle lights, which will substantially eliminate the glare and yet provide a strong beam of light that will project forwardly of the light a sufficient distance, so that the driver behind the lights can see the road at a great distance ahead of him.

Another object is to provide a light provided with a contracted portion, which will form a funnel or chute, whereby the rays of light will be concentrated, so that when they leave the light an intensified beam of light will be thrown forwardly.

Still another object is to provide a shade, which projects forwardly and downwardly of the lens, so that all the rays of light will pass down upon the ground and not upwardly.

A further object is to provide the shades with glass portions, which may be colored, so that the colored light will be noticeable from a great distance by any advancing vehicle.

Still a further object of my invention is to provide an attachment for the ordinary parabolic type of reflectors or lamps, which when installed will tend to intensify and concentrate the rays of light, so that when they pass through the lens a beam of light will be thrown forwardly, the attachment being provided with a forwardly extending shade member, which prevents any of the rays from passing upwardly.

Still a further object is to provide a light, so that the rays when passing through the lens will be spread out, so that the two lights of the vehicle will overlap and cover substantially the entire road, yet none of the rays being reflected into the eyes of a driver of a vehicle coming from the opposite direction.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a front elevation of an automobile with my improved lights installed thereon.

Figure 2 is a central, seconal view through my attachment installed upon an ordinary parabolic type of light.

Figure 3 is a vertical, central, sectional view taken on the line 3—3 of Figure 2, showing the glass portion in the shade.

Figure 4 is a vertical, central, sectional view taken through one of the lights, which is a slightly modified form of that shown in Figure 2.

Figure 5 is a vertical, sectional view taken on the line 5—5 of Figure 4.

Figure 6 is a front elevation of a modified light, the lens being oblong in shape.

Figure 7 is a side elevation of the form of the device shown in Figure 6.

Figure 8 is a vertical, sectional view taken on the line 8—8 of Figure 7; and

Figure 9 is a top plan view of the form of light shown in Figure 6.

In the accompanying drawings, I have used the reference numeral 10 to indicate generally any vehicle, which may be equipped with either electric or other types of lights.

An ordinary light casing 11, which is the ordinary common form of lights now in use, is shown in Figure 2.

The interior surface of the casing 11 is highly polished at 12, so as to provide a reflector surface.

My device comprises a funnel or chute-shaped portion 13, which is provided on its inner surface with a highly polished reflector surface 14. At the rear edge of the chute 13, I have provided a plate 15, which has its inner surface polished as at 16. The plate 15 is circular in outline, and is provided with a flange 17, which has its free edge turned inwardly, so as to form the hook 17ª.

The light casing 11 is provided on its forward edge with a band 18.

My attachment, as shown in Figure 2, is placed onto the light casing 11 by forcing the hook portion 17ª of the flange 17 over the band 18, the flange 17 being made of resilient material permits the springing of the parts to the position, where the attachment may readily and easily be installed or removed from the light casing 11.

It will be seen that the plate 15 is substantially larger than the chute 13. The lower or under side of the chute 13 is inclined from its rear edge towards its front edge. Fixed in the forward end of the chute 13 is a bull's-eye lens 19. The lens 19 is mounted in a band 20, which may be forced into the chute 13 and held against inward movement by means of the lug 21. The lens 19 is slightly inclined, so that the rays of light passing therethrough will be shot forwardly and downwardly.

In order to positively eliminate any upward rays of light, I have provided a forwardly and downwardly extending shade member 22, which projects down, so that its forward edge is below the upper edge of the lens 19.

The shade members 22 are provided in their outer sides with a glass portion 23, which is held in place by means of the hooks or fingers 24, which are formed in the shade member 22. The glass 23, which is fixed in the shade, is preferably colored either red or green, the red glass being used on the light on the left-hand side of the automobile, while the green light is used on the right-hand side of the automobile.

The shade 22 is curved in cross section, as shown in Figure 3 of the drawings.

In Figure 4, I have shown a slightly modified form of device, in which the casing and chute are formed integral and adapted to be installed as a complete light.

In this form of device, a casing 25 is provided, which is comparatively larger and is provided on its inner side with a highly polished surface 26. In the rear or back side of the casing 25, I have provided a pair of socket members 27, which receive the lamps 28. By using two or more lamps 28, I am able to increase the amount of light that will pass out through the lens.

The casing 25 is provided on its forward side with the chute 29, which has its under side inclined similar to that shown in Figure 2 of the drawings.

The lens 19, mounted in the band 20, is fixed in the forward end of the chute 19. A shade 30 is provided on the upper forward edge of the chute 29, which is similar to the shade member 22.

It will be understood that the entire inner surface of the casing 25 and the chute 29 is highly polished, so as to provide a reflector surface.

It will be seen that the lens 19 is circular in outline, which will tend to throw a spotlight on the ground, and that by using two lamps, there will practically be two lighted portions on the road, the light being of greater intensity than that produced by the ordinary vehicle light.

In Figures 6 to 9 inclusive, I have shown a lens 31, which is oblong, so that a wide beam of light will be thrown upon the road. By providing the wide beam of light, I am able to substantially illuminate the entire width of the road, yet without throwing any glaring light into the eyes of the driver coming in the opposite direction.

Shade members 32 are provided which extend forwardly and downwardly for preventing any upward rays of light, and are also provided with the glass portions 33.

In this form of the device, the chute which gives the concentrated effect to the rays of light may be either made as an attachment for fitting the ordinary light casing, as that illustrated in Figure 2, or may be made as a complete device similar to that shown in Figure 4 of the drawings.

It will be seen that by the use of my device, I have practically eliminated the inconvenience of throwing the dimmers on and off, as is the ordinary case in country driving, yet my light will always be a strong, powerful light without affecting the driver coming in the opposite direction.

The amount of light thrown upon the road never affects the driver of the car coming in the opposite direction. It is only the rays of light that reflect upwardly that are harmful.

One of the advantages of my device is that I am able to install my device upon the ordinary light now in commercial use, so that it will not be necessary for an entire new light to be installed upon the automobiles.

Some changes may be made in the arrangement and construction of the various parts of my device, without departing from any of the essential features and purposes of my invention, and it is my intention to cover by my claim, any modified forms of structure or use of mechanical equivalents, which may be reasonably included within its scope.

I claim as my invention:

A motor vehicle light reflector including a light housing having its forward end open and its interior formed of reflecting material, a casing adapted to extend over the opening of the housing, said last casing comprising a plate arranged with an opening, an annular flange on said plate for securing it to the light housing, a forwardly extending chute like member on said plate and over the opening, a glass in the forward end of said chute like member, the interior of said casing being formed of reflecting material, the lower side of the chute like member being inclined upwardly thereby forming a restricted opening through which the light is permitted to pass, all for the purposes specified.

Des Moines, Iowa, October 30, 1920.

ERNEST S. WOOLLEY.